Figure 3:
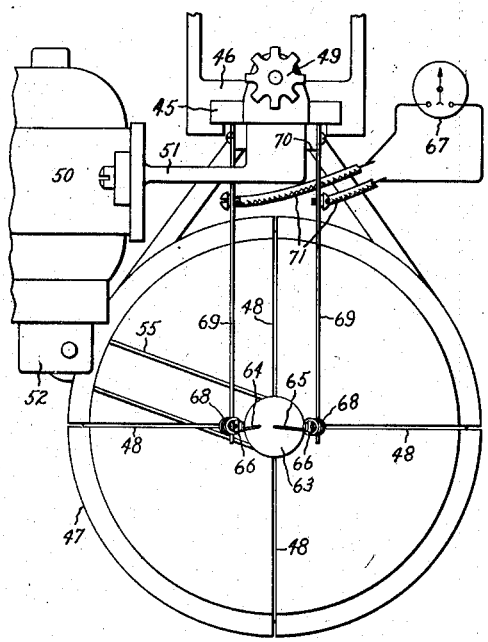

July 13, 1943.  E. J. WESTERLUND  2,324,449
METHOD AND APPARATUS FOR ASCERTAINING THE FOCUS OF REFLECTORS
Filed Aug. 24, 1939  2 Sheets-Sheet 1
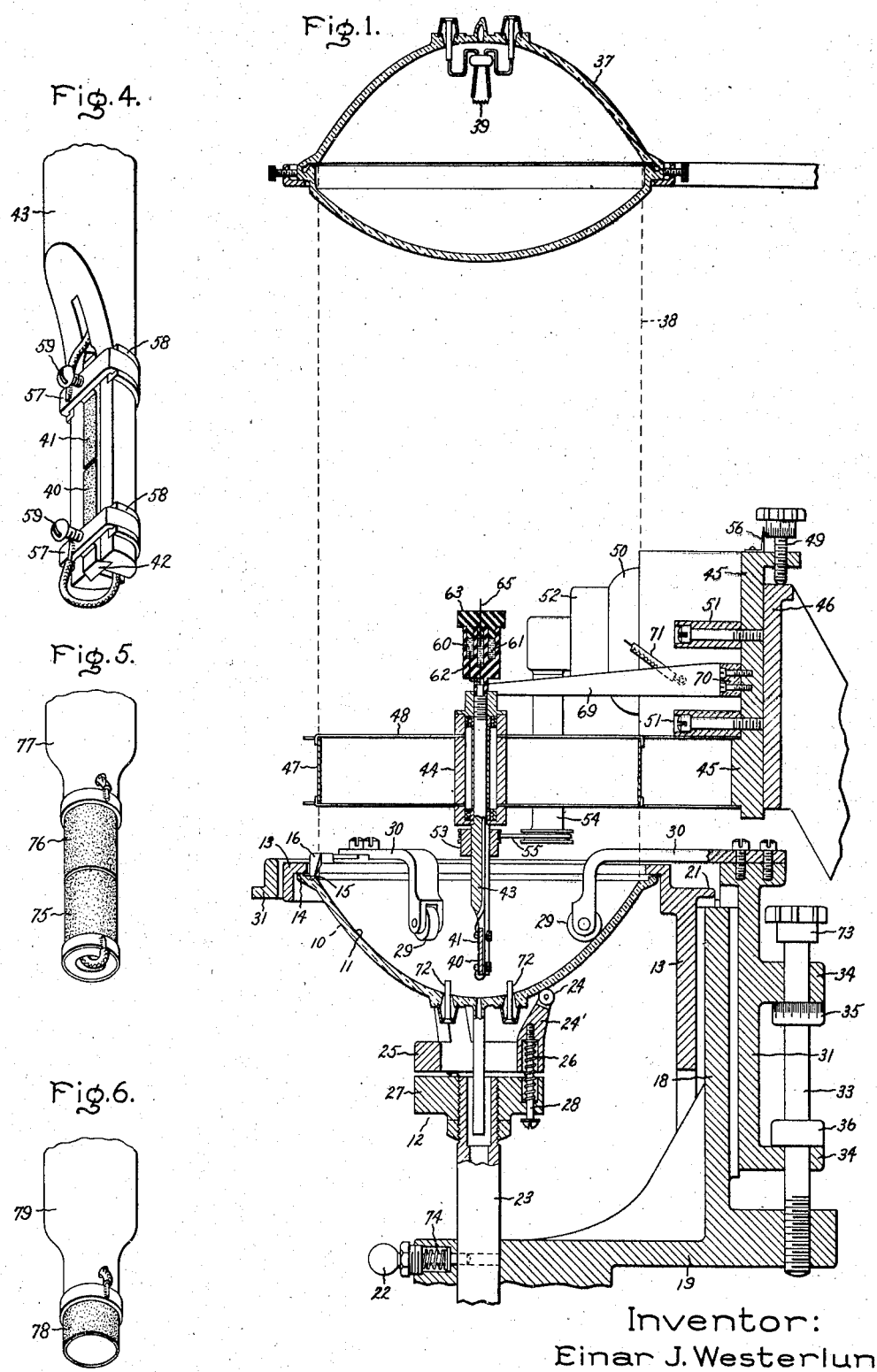
Inventor:
Einar J. Westerlund,
by Harry E. Dunham
His Attorney.

July 13, 1943.  E. J. WESTERLUND  2,324,449

METHOD AND APPARATUS FOR ASCERTAINING THE FOCUS OF REFLECTORS

Filed Aug. 24, 1939   2 Sheets-Sheet 2

Inventor:
Einar J. Westerlund,
by Harry E. Dunham
His Attorney.

Patented July 13, 1943

2,324,449

UNITED STATES PATENT OFFICE 2,324,449

METHOD AND APPARATUS FOR ASCERTAINING THE FOCUS OF REFLECTORS

Einar John Westerlund, Warren, Ohio, assignor to General Electric Company, a corporation of New York Application August 24, 1939, Serial No. 291,722

10 Claims. (Cl. 88—14)

My invention relates to methods and apparatus for ascertaining very accurately the focus of a reflector, and is particularly useful for determining the proper position to locate a light source in a reflector forming part of a light projector. Still more particularly, my invention relates to the finding of the focus, the equivalent focus, or the optimum point for the light source in a projection reflector of revolution or modification thereof.

For the proper distribution of the light from a projector and the efficient use thereof, the light source must be located accurately with respect to the reflector thereof. Heretofore, a removable incandescent lamp served as the light source and inaccuracies of manufacture were compensated for either by optically positioning the filamentary light source with respect to the base of the lamp during manufacture or by adjustment of the lamp in and out of the projection reflector usually by visual examination of the projected pattern of the light beam. In both cases, inaccuracies in the reflector and in the mounting of the lamp were not fully compensated for, and improved projectors have therefore been devised in which the light source is permanently mounted in combination with the reflector to avoid all former disadvantages. Lamps of this type take two forms, one, in which an ordinary incandescent lamp is fastened permanently to the reflector in the proper position, and a second, in which the reflector is included in the construction of the lamp as disclosed in Patent 2,148,314, D. K. Wright. Incandescent lamps having the reflector built therein must be adjusted so that the light source, the filament, is at the proper position before they are sealed since the lamps do not allow adjustment or prefocusing to be brought about in the usual manner as the said filament cannot be conveniently brought to incandescence at this time without injury thereto.

The principal object of my invention is to determine optically the proper position for the light source in a projecting reflector prior to the mounting of a light source therein. The method must take into account all variations and inaccuracies of manufacture so that the light source can be located at the best possible position in the reflector for the results desired.

Another object of my invention is to provide a method and apparatus for determining the point of concentration of the light redirected by a projecting reflector when a controlled beam is directed thereon. This method of operation permits determination of either the focus or another point therein at which the light source can be mounted to produce the light beam desired. Once the focus is determined, the light source can be mounted thereat or with relation thereto, whereas the determination of any other point for the light source assures only that a light beam corresponding to that directed onto the concentrating reflector during the test will be projected thereby upon operation of said light source.

Another object of my invention is to provide a method and apparatus for measuring the concentration of light along the axis of a concentrating reflector when a controlled light beam is directed thereinto.

Further objects and advantages of my invention will appear from the following description of methods of operation comprising my invention and from the drawings.

Figure 2:
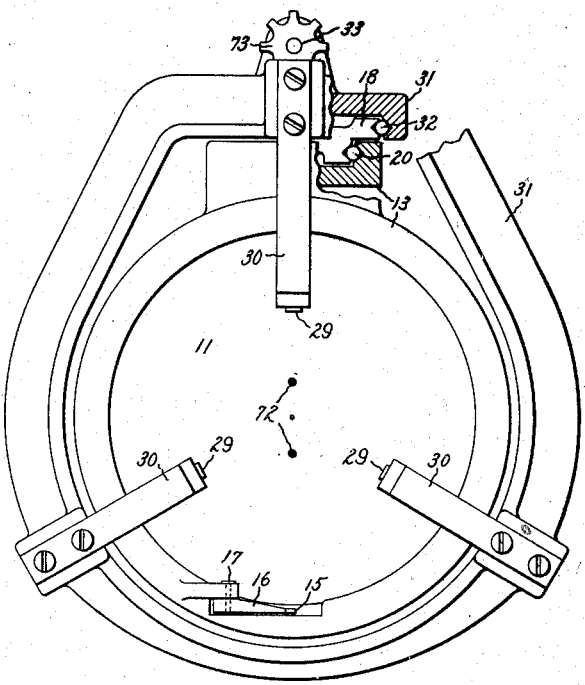
Figure 8:
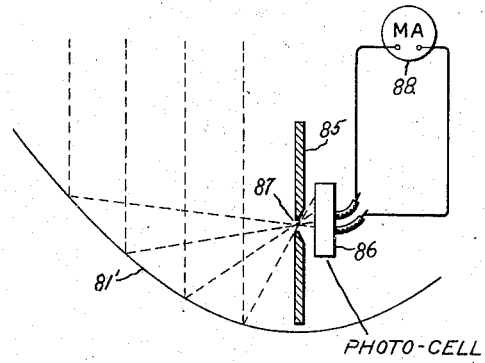
Figure 7:
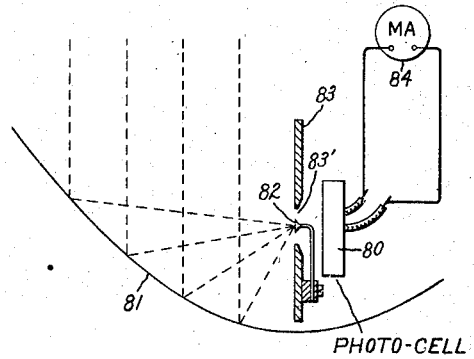

In the drawings, Fig. 1 is a vertical section through the center of one species of testing apparatus comprising my invention; Fig. 2 is a plan view of a reflector positioning portion of said apparatus; Fig. 3 is a plan view of a photo-cell supporting and moving portion thereof; Fig. 4 is a perspective view of a photo-cell and holding means therefor; Figs. 5 and 6 are perspective views of modified photo-cells for use with the apparatus; and Figs. 7 and 8 are diagrammatic views of other modifications of apparatus comprising my invention.

To operate the species of my apparatus shown in Figs. 1 to 4 inclusive, the light projecting reflector 10 is first inserted therein and positioned so that it is level and centered in the apparatus. The reflector 10 in the instance shown is a type forming part of the lamp disclosed in the Wright patent hereinbefore referred to in that it is made of pressed glass having an extremely accurately formed interior surface with a reflecting coating 11 thereon. At the time of insertion, the holder 12 is at a lower position than shown and the reflector 10 is inserted under the leveling ring 13 and moved upward until the shoulder 14 which bears a definite relation to the reflecting surface, is brought into engagement with said leveling ring 13.

It is also preferred that the reflector 10 be turned so that the protuberance 15 (Figs. 1 and 2) at a point adjacent the rim thereof is carried against the end of the finger 16 which is held by the leveling ring 13 so that said reflector 10 also assumes a definite angular relation to the apparatus. The finger 16 is pivoted on the pin 17 carried by the leveling ring 13 so that it will move upward and allow the protuberance to pass into position if the reflector 10 is turned counter-clockwise and is so weighted as to fall back into position when the protuberance 15 passes from under it.

The leveling ring 13 engages corresponding vertical guide ways at opposite sides of the vertically extending portion 18 of the stationary bracket 19 through the ball bearings 20 as shown in Fig. 2 and, at the moment the reflector 10 is inserted, is positioned by the flange 21 which rests on the top of said bracket 19. The holder 12 is now raised manually until the pin 22 carried by the bracket 19 enters a hole in the supporting rod 23 therefor, and the rollers 24 on the three equidistantly spaced arms 24' of the ring 25 are against the bottom of the reflector 10. The ring 25 rests on three springs 26 carried by the collar 27 attached to the upper end of the rod 23 and is held in place thereon by screws 28 extending through the springs 26 and slidably engaging the collar 27.

The function of the holder 12 is both to keep the reflector 10 in position on the leveling ring 13 and, through the expansion of the springs 26, to raise it and said leveling ring 13 until the reflecting surface 11 engages and is positioned by the rollers 29 on three equidistantly spaced angular arms 30. The arms 30 are fastened to a portion of the bracket 31 encircling the leveling ring 13 and hold the rollers 29 at exactly one level and the same distance from a vertical axis through the apparatus so that the reflector 10 is automatically positioned vertically and centralized therein. The bracket 31 engages the vertical slide ways on opposite sides of the vertical portion 18 of the bracket 19 through the ball bearings 32 as shown in Fig. 2 and takes a vertical position governed by the rod 33 which screws into the base of said bracket 19 and which engages lugs 34—34 of said bracket 31 through the collars 35 and 36.

In alignment with the reflector 10 and preferably at some distance (five feet in this particular instance) therefrom is mounted a light projector 37 directing downward and into the reflector 10 a light beam 38 of parallel rays as indicated. The light beam 38 upon striking the reflecting surface 11, is redirected toward the focus thereof as said surface is parabolic, and it is the accurate determination of this point that is the principal function of my apparatus in this particular instance. By spacing the light projector 37 some distance from the reflector 10, very little of the uncontrolled light from the filament 39 thereof reaches said reflector 10. If a differently shaped reflecting surface is to be examined, it is usually preferred that a different light beam corresponding to that which will ultimately be projected thereby be directed into the reflector 10 along the light projection axis thereof by the projector 37. The beam projected into the reflector 10 must be angularly similar to the beam which the said reflector 10 is capable of projecting but opposite in direction. In some instances, the said projector may have to be mounted at a different distance from the reflector 10 and a lens may possibly have to be interposed therebetween to produce the light beam required.

The determination of the focus or other point of concentration of the light in the reflector 10 is made with the aid of the finding apparatus shown in Figs. 1 and 3. This apparatus in this instance supports the photo-cells 40 and 41 which are arranged one above the other with their light sensitive faces on the axis of projection of the reflector 10. The photo-cells 40 and 41 as shown in detail in Fig. 4 are formed by cutting the light sensitive coating on the comparatively narrow (½ inch) metal block 42 with a very sharp tool and are connected in series due to the conductive properties thereof so that the electric current generated by each counteracts that of the other and current flows only when one photo-cell generates more current than the other. The photo-cells 40 and 41 are mounted on the end of the spindle 43 which is held by the ball bearings in the hub 44 in a position determined by the slide 45 in the ways of the bracket 46 which is attached to said hub 44 through the ring 47 and spokes 48. The slide 45 is positioned by the adjusting screw 49 which bears against the bracket 46 and is preferably counterbalanced so that it and the photo-cells 40 and 41 are easily adjusted vertically. The spindle 43 is rotated, to cause the photo-cells 40 and 41 to pick up light from all sides of the reflector 10 in a uniform manner, by the electric motor 50 which is mounted on the slide 45 through the bracket 51 and which operates said spindle 43 through the usual form of speed reducer 52 incorporated therewith, the pulleys 53 and 54 and the belt 55. By prior calibration of the apparatus, the markings on the head of the adjusting screw 49 when compared with the pointer 56 and other markings (not shown) on the slide 45 and the bracket 46 indicate the position of the separation between the photo-cells 40 and 41 in the reflector 10 when the bracket 31 of the vertically positioning means is at a predetermined position.

When the reflector 10 is first inserted into the apparatus, the photo-cells 40 and 41 are most likely off position vertically and one or the other is receiving more light and causing a flow of current in the circuit in which they are connected. The connections are made to the terminals of each of the photo-cells 40 and 41 through the metal bands 57 which lie in a channel in the semi-circular insulating blocks 58 located in grooves in the spindle 43 and which engage the special solid metal contact strips on the photo-cells through the screws 59. The bands 57 are connected through insulated wires extending upward through a slot in the spindle 43 to the mercury pools 60 and 61 in a commutator which is comprised of the cup portion 62 on the upper end of said spindle 43 and the stationary cap 63 rested thereon. Both the cup portion 62 and the cap 63 are made from insulating material and the circuit therethrough is made through the wires 64 and 65 (Fig. 3) carried by the cap 63 which dip into the mercury pools 60 and 61 respectively, and which are connected to the screws 66 extending from opposite sides thereof. The circuit to the galvanometer 67, which is mounted adjacent the finding apparatus, is made through the downwardly extending helical springs 68 which hang from the screws 66, the metal arms 69 which are attached to the insulating block 70 on the slide 45 and the wires 71. The springs 68 and the arms 69 also function as a holding means for the cap 63 of the commutator to keep it from turning. Any displacement of the photo-cells 40 and 41 is indicated by a right or left deflection of the pointer of the galvanometer 67 and the proper manual adjustment of the screw 49 in the correct direction is easily made.

When the photo-cells 40 and 41 are at the correct location, like amounts of light fall on each and the galvanometer shows no deflection in either direction. This position of the photo-cells 40 and 41 is indicated by markings hereinbefore referred to which can be set up so as to give the distance vertically between said position and a reference point such as the ends of the metal leads 72 on the reflector 10 or the shoulder 14 thereof, for instance. In some instances, it may be more desirable to adjust the reflector 10 with respect to the photo-cells 40 and 41 and in such instances the adjustment is made by turning the knob 73 on the end of the rod 33. The position of the reflector 10 is then indicated by comparing markings on the collar 36 and the lug 34 of bracket 31 and other markings (not shown) on the bracket 31 and bracket 10. All parts of the finding apparatus in the path of the light beam 38, such as the hub 44, spokes 46 and the ring 47 are provided with a dull black finish to prevent uncontrolled reflection of the light of said beam 38. After the determination of the point of concentration of the reflected light, the reflector 10 is taken from the apparatus by first pulling the pin 22 from the hole in the rod 23 against the pressure of the spring 74 and then allowing the holder 12 and the reflector 10 to drop clear.

The markings of the finding apparatus can be calibrated so that the focus or point of concentration of the reflected light with respect to the various parts thereof engaged by the positioning means of said apparatus is indicated directly or in same relative value. Once the focus or point of concentration of the reflected light is determined, the light source can easily be positioned at said point or at a given relation thereto. To do this it may be necessary to mount the reflector in a holder much the same as in the finding apparatus, but in place of the photo-cells have a pointer or other indicating means which can be adjusted to the focus, the light concentrating point, or the point at which the light source is to be mounted, from the readings given by the finding apparatus. The light source, a coiled metal filament in the instance shown, can then be mounted at the point indicated, either manually or with the help of existing apparatus.

To avoid the necessity of rotating the photo-cells 40 and 41 to cause them to scan the complete reflection 10, cylindrical photo-cells 75 and 76 as shown in Fig. 5 can be used. The photo-cells 75 and 76 are then mounted on a spindle 77 located on the light projection axis of the reflector 10 in place of spindle 43 and the adjustment thereof takes place in the manner previously described.

Another modification of the finding apparatus is shown in Fig. 6 which makes use of only a single cylindrical photo-cell 78. This photo-cell 78 is relatively narrow, having a sensitive area of, for instance, only 1/32 to 1/8 of an inch in width and is manipulated by the spindle 79 on which it is mounted until the greatest amount of light is intercepted thereby. The reflector-locating apparatus and the finding apparatus, except for the rotating means and the photo-cells 40 and 41 of Figs. 1, 2 and 3, are preferably used in combination with the photo-cell 78.

In the first two species described above, the function of the photo-cells 40—41 and 75—76 is to intercept the light above and below a relatively narrow band established by the division between photo-cells and is much the same as the modification shown in Fig. 7 although here the non-light-sensitive area has appreciable width. This particular construction allows a photo-cell 80 of commercial size to be used but is only adapted to test one-half of the reflecting surface 81 at one time. A relatively small round opaque screen 82 of limited area is preferably mounted at the center of an opening 83' in a second opaque screen 83 dividing the reflecting surface 81 in half, and the photo-cell 80 is mounted behind the round opaque screen 82 and the opening 83' in position to intercept the light passing therebetween. The reflector is explored by moving the screens 82 and 83 in and out of the reflector along the axis thereof until the least amount of light falls on the photo-cell 80 as indicated by the milliammeter 84 attached thereto, at which time the screen 82 is at the concentration point of the light. At other times, when the screen 82 is off position, the light passing through this point enters the opening 83' in the screen 83 and falls on the photo-cell 80. The purpose of the screen 83 is to prevent stray uncontrolled light from falling on the photo-cell 80. A slide, such as shown at 45, as well as the positioning apparatus shown in Fig. 1, can be used to support the screens 82 and 83 and the reflecting surface 81 respectively, if desired. One test of a reflecting surface by this modification of my invention is usually not reliable and four tests, each after 90 degrees of rotation of either the reflecting surface or the finding apparatus, are preferred. In such instances, an average position is calculated for the focus.

Another modification of my invention is illustrated in Fig. 8 which makes use of a screen 85 dividing the reflector 81' in half. This modification corresponds in a general way to that shown in Fig. 6 in that the point of concentration of the light is reached when the photo-cell 86 receives the maximum amount of light. The photo-cell 86 is mounted behind the small circular opening 87 of limited area in the screen 85 which is repositioned along the axis of the reflector 81' until the maximum amount of light passes through said opening 87 and the maximum reading is given by the milliammeter 88. It is preferred that four tests be made at 90 degree positions as in the prior instance and an average position be calculated. This apparatus as well as that shown in Fig. 6 can also be used to test the light efficiency of the reflector 81' as the reading given by the milliammeter 88 corresponds to the amount of light received by the photo-cells 86 and 78.

A thermo-couple or some other form of heat sensitive means can be used in place of the photo-cells in the apparatus disclosed with equally good results but a greater time interval is required for a reading.

It will be obvious that it is important that the portion of the focus locater which is actually at the focus of the reflector when the device is properly positioned must have a small area in order that the device be accurate. This portion, which is referred to in one of the claims as the "reference portion," is the narrow uncoated space between surfaces 40 and 41 in Fig. 4, the corresponding space between surfaces 75 and 76 in Fig. 5, the surface 78 itself in Fig. 6, the shield 82 in Fig. 7, and the opening 87 in Fig. 8.

What I claim as new and desire to secure by Letters Patent of the United States is:

1. The method of determining the proper position for a light source in a reflector which comprises directing light into said reflector at the same angularity to the light projection axis thereof as that desired of the light to be projected thereby when said light source is in position, and finding a limited area along said axis where the redirected light passing thereabout is a minimum by placing a screen of limited area in a plane passing through said projection axis with a light-sensitive cell held behind said screen and then moving said screen along said axis within the reflector until the light falling on said cell is a minimum.

2. The method of determining the proper position for a light source in a reflector which comprises directing light into said reflector at the same angularity to the light projection axis thereof as that desired of the light to be projected thereby when said light source is in position, and finding the point of concentration of the redirected light from an angularly restricted area of the reflector about the said axis by moving along said axis a screen member located in a plane passing through said axis within the reflector with a light-sensitive cell held behind said screen.

3. The method of determining the proper position for a light source in a reflector which comprises directing light into said reflector at the same angularity to the light projection axis thereof as that desired of the light to be projected thereby when said light source is in position, and finding the point of concentration of the redirected light from each of a plurality of angularly restricted areas of the reflector about the said axis to determine an average position for the light source by moving along said axis, in a plurality of different angular positions, a screen member located in a plane passing through said axis within the reflector with a light-sensitive cell behind said screen.

4. Apparatus for determining the proper position for a light source in a reflector having an axis of projection comprising a pair of photocells mounted closely adjacent and in alignment with each other in the direction of said axis of projection, means for definitely positioning said reflector with relation to the photo-cells and aligning its light projection axis therewith, means for directing light onto said reflector at the same angularity to its light projection axis as that desired of the light to be projected thereby, means for permitting the adjustment of the photo-cells and said reflector with relation to each other along said axis and means connected to the photo-cells for indicating the proportionate amounts of light intercepted thereby so that the relation of each photo-cell to the point of concentration of the light redirected by the reflector is indicated.

5. Apparatus for determining the proper position for a light source in a reflector having an axis of projection comprising a pair of photo-cells mounted closely adjacent and in alignment with each other in the direction of said axis of projection, means for definitely positioning said reflector with relation to the photo-cells and aligning its light projection axis therewith, means for directing light onto said reflector at the same angularity to its light projection axis as that desired of the light to be projected thereby, means for rotating the photo-cells on the light projection axis to permit them to intercept light from all portions of the reflector, means for permitting the adjustment of the photo-cells and said reflector with relation to each other along said axis and means connected to the photo-cells for indicating the proportionate amounts of light intercepted thereby so that the relation of each photo-cell to the point of concentration of the light redirected by the reflector is indicated.

6. Apparatus for determining the proper position for a light source in a reflector having an axis of projection comprising a pair of cylindrical photo-cells mounted closely adjacent and in alignment with each other in the direction of said axis of projection, means for definitely positioning said reflector with relation to the photo-cells and aligning its light projection axis therewith, means for directing light onto said reflector at the same angularity to its light projection axis as that desired of the light to be projected thereby, means for permitting the adjustment of the photo-cells and said reflector with relation to each other along said axis and means connected to the photo-cells for indicating the proportionate amounts of light intercepted thereby so that the relation of each photo-cell to the point of concentration of the light redirected by the reflector is indicated.

7. Apparatus for determining the proper position for a light source in a reflector having an axis of projection comprising means for holding the reflector in a definite position, means for directing light onto said reflector at the same angularity to its light projection axis as that desired of the light to be projected thereby, a shield of limited area arranged to be located in a plane passing through said projection axis and to be moved relatively to the reflector along said projection axis of the reflector, light-sensitive means mounted to one side of said shield in a position to receive the light from the portion of the reflector on the opposite side thereof and not intercepted thereby, and means for indicating the amount of light falling on said light-sensitive means during movement of said shield along said axis so that the relation of the shield to the point of concentration of the light redirected by this portion of the reflector is indicated.

8. Apparatus for determining the proper position for a light source along the axis of projection of a parabolic reflector comprising a pair of photo-cells mounted closely adjacent and in alignment with each other in the direction of said axis of projection, means for definitely positioning said reflector with relation to the photo-cells and aligning its light projection axis with the active portions of said photo-cells, means for rotating the photo-cells on said axis, means for directing light into the reflector parallel to the projection axis thereof, means for permitting the adjustment of the photo-cells along said axis, means connecting said photo-cells together, and means connected to corresponding terminals of each of said cells for indicating the proportionate amounts and polarity of the current generated by the said photo-cells so that their relation to the focus is indicated.

9. Apparatus for ascertaining the focus of a concave reflector comprising means for supporting the reflector, means for directing into said reflector a light beam which is angularly similar to the beam for which the reflector was designed but opposite in direction, a light-sensitive device mounted so as to be located within the reflector, said light-sensitive device comprising a conductive base member extending along the light-projecting axis of the reflector and having light-sensitive coatings thereon above and below a narrow uncoated space, said reflector supporting means and said light-sensitive device being arranged for relative movement along the said axis of the reflector, and means electrically connected to the said light-sensitive surfaces for indicating the proportionate amounts of light intercepted thereby, the said uncoated space portion being located at the focus of the reflector when the said surfaces are receiving equal amounts of light.

10. Apparatus for ascertaining the focus of a concave reflector comprising means for supporting the reflector, means for directing into said reflector a light beam which is angularly similar to the beam for which the reflector was designed but opposite in direction, focus locater means including light-sensitive means, electric current measuring means connected to said light-sensitive means, said locater means having a reference portion thereof of very small area, said locater means and said reflector supporting means being arranged for relative movement of said reference portion of the locater means along the axis of the reflector and through its focus, said reference portion of the locater means being arranged so that when properly positioned it is in the path of light converging at the focus of the reflector from points both ahead of and behind its focal plane so that a distinctive reading is obtained on said current measuring means.

EINAR JOHN WESTERLUND.